UNITED STATES PATENT OFFICE.

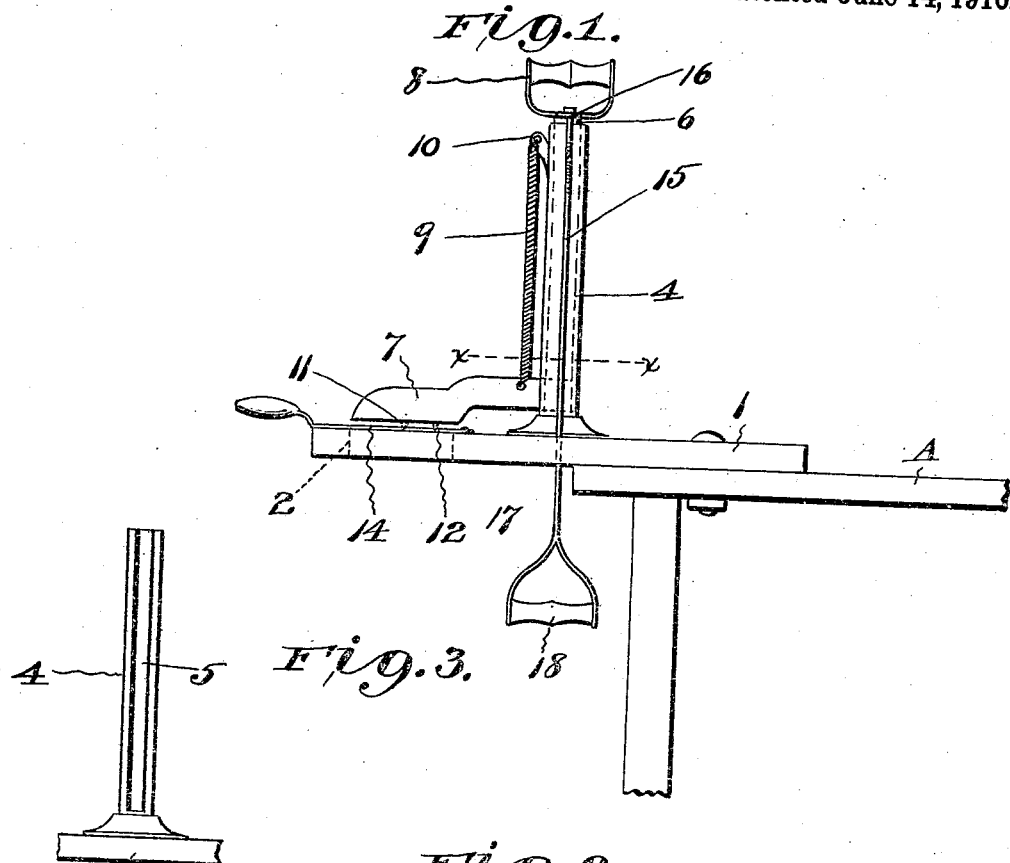

BENTON R. LYSTER AND MORTON J. LYSTER, OF WHITEFIELD, NEW HAMPSHIRE.

SEED-POTATO-CUTTING MACHINE.

961,363.  Specification of Letters Patent.   Patented June 14, 1910.

Application filed May 13, 1909. Serial No. 495,688.

*To all whom it may concern:*

Be it known that we, BENTON R. LYSTER and MORTON J. LYSTER, citizens of the United States, and residents of Whitefield, in the county of Coos and State of New Hampshire, have invented certain new and useful Improvements in Seed-Potato-Cutting Machines, of which the following is a specification.

Our invention relates to machines for cutting seed potatoes, and has for its object the provision of a device consisting of a base having an opening therein in which are secured a plurality of blades crossed in the center and a reciprocating plunger having an arm secured thereto to engage the potato to push it through the opening, where it is sliced by the knives. A cross-cut knife is pivotally secured to the base and adapted to swing across the opening to cut the potatoes cross-wise, so that the potato may be cut into as many pieces as found expedient for efficient planting, and the "butt" or "seed" end of the potato may be cut off and thrown outside for use in feeding stock.

Our invention will be described in detail hereinafter and illustrated in the accompanying drawings, in which—

Figure 1 is a side view of our seed-potato cutter, showing it mounted on a table; Fig. 2, a plan view of the base, showing the plunger casing or support in section; and Fig. 3, an end view of the machine.

In the drawings similar reference characters indicate corresponding parts throughout all of the views.

The base 1 of our improved machine may be secured to a table A or any other suitable support, and is provided with a hole 2, preferably circular, in the edges of which are secured a plurality of cutting-blades 3, diametrically disposed and crossed in the center of the opening. The number of blades shown in the drawings is two, so that the potato will be cut into four slices, but the number may be increased to three or more, if desired, without altering the spirit of our invention.

4 indicates an upright tubular casing secured to base 1 and provided with a longitudinal slot 5 on the sides next to the opening 2 and opposite thereto.

6 indicates a plunger slidably mounted in casing 4, 7 an arm secured to the lower end of the plunger and slidably mounted in slot 5, and 8 a handle secured to the upper end of the plunger to actuate it.

9 indicates a coil-spring secured to arm 7 and projection 10 extending from the casing to hold the arm and plunger normally in a raised position.

The under side of arm 7 is provided with pins 11 and 12 or other holding devices located above the opening 2 to engage the potato, pin 11 being directly above the center of the opening and the crossed part of the blades 3, while the pin 12 is over one blade only, so that the device is adapted for use with large or small potatoes, the larger potatoes, being engaged by pin 11, being cut into the number of slices of which the blades are capable, while smaller potatoes, which may have a smaller number of "eyes," will be engaged by pin 12 and cut into only two slices.

14 indicates a knife pivotally secured to the top of base 1, and mounted to swing across opening 2, which is used to cut the potato crosswise into chunks when the size of the potato cut will permit it, and also may be used to cut off the butt or seed end of the potato which is engaged by pin 11 and which contains no eyes, so that the end may be put aside to be used as stock-feed.

15 indicates a rod secured to an ear 16, extending laterally from the handle 8, extended through a hole 17 in base 1, and having a handle 18 secured to its lower end to operate plunger 6, if desired.

We have described our invention as being used to cut potatoes, but it is apparent that it may be used to slice other roots and fruits for culinary, stock-feeding, or drying purposes, if desired, so that we do not limit ourselves to its application, as stated.

Having thus described our invention, what we claim is—

A seed-potato slicing machine comprising a base having an opening therein, slicing-blades secured diametrically of said opening, a tubular casing mounted on said base adjacent to said opening, said tubular casing having a longitudinal slot therein, a plunger mounted in the casing, an arm secured to the plunger and extending through the slot in the casing, the end of the arm extended over the opening in the base, a spring secured to the arm and casing to normally raise the arm, a handle secured to the upper end of the plunger, a rod secured to the handle and extended downwardly through the base, a handle secured to the lower end of the rod under the base, and a knife pivotally secured to the base and adapted to swing over the opening therein.

In witness whereof, we have hereunto set our hands in presence of two subscribing witnesses.

BENTON R. LYSTER.
MORTON J. LYSTER.

Witnesses as to signature of Benton R. Lyster:
JOSEPH DESPRÉS,
J. H. BOURGET.

Witnesses as to signature of Morton J. Lyster:
LULU B. MASTERS,
E. M. BOWKER.